(12) United States Patent
Achilles et al.

(10) Patent No.: US 9,831,810 B2
(45) Date of Patent: Nov. 28, 2017

(54) SYSTEM AND METHOD FOR IMPROVED REACTIVE POWER SPEED-OF-RESPONSE FOR A WIND FARM

(71) Applicant: General Electric Company, Schenectady, NY (US)

(72) Inventors: Alfredo Sebastian Achilles, Niskayuna, NY (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 14/642,869

(22) Filed: Mar. 10, 2015

(65) Prior Publication Data

US 2016/0268940 A1 Sep. 15, 2016

(51) Int. Cl.
| | |
|---|---|
| G06F 19/00 | (2011.01) |
| H02P 9/00 | (2006.01) |
| H02J 3/38 | (2006.01) |
| H02J 3/18 | (2006.01) |
| F03D 9/25 | (2016.01) |
| H02P 101/15 | (2016.01) |
| H02P 103/20 | (2016.01) |

(52) U.S. Cl.
CPC ............... *H02P 9/00* (2013.01); *F03D 9/257* (2017.02); *H02J 3/1842* (2013.01); *H02J 3/386* (2013.01); *H02P 2101/15* (2015.01); *H02P 2103/20* (2015.01); *Y02E 10/763* (2013.01); *Y02E 40/22* (2013.01)

(58) Field of Classification Search
CPC .... H02P 9/00; H02P 2103/20; H02P 2101/15; H02J 3/1842; H02J 3/386; Y02E 10/763; Y02E 10/723; Y02E 40/30
See application file for complete search history.

(56) References Cited

U.S. PATENT DOCUMENTS

| | | | | |
|---|---|---|---|---|
| 5,570,007 A | * | 10/1996 | Larsen ................. | H02J 3/1828 323/209 |
| 6,924,565 B2 | | 8/2005 | Wilkins et al. | |
| 6,965,174 B2 | | 11/2005 | Wobben | |
| 7,119,452 B2 | * | 10/2006 | Larsen .................... | F03D 9/005 290/44 |
| 7,166,928 B2 | | 1/2007 | Larsen | |
| 7,531,911 B2 | | 5/2009 | Rivas et al. | |
| 7,923,862 B2 | | 4/2011 | Cardinal et al. | |

(Continued)

*Primary Examiner* — Michael D Masinick
(74) *Attorney, Agent, or Firm* — Dority & Manning, P.A.

(57) ABSTRACT

The present subject matter is directed to a system and method for regulating reactive power in a wind farm connected to a power grid so as to improve reactive speed-of-response of the wind farm. The method includes receiving a voltage feedback from the power grid and a voltage reference and calculating a linear voltage error as a function of the voltage feedback and the voltage reference. A further step includes generating a first output based on the linear voltage error via a first control path having a first voltage regulator. A further step includes determining a non-linear voltage error based on the linear voltage error via a second control path having a second voltage regulator. A second output is generated via the second control path based on the non-linear voltage error. As such, a reactive power command is generated as a function of the first and second outputs.

19 Claims, 9 Drawing Sheets

(56) References Cited

U.S. PATENT DOCUMENTS

| | | | |
|---|---|---|---|
| 8,041,465 B2 | 10/2011 | Larsen et al. | |
| 9,166,500 B2 * | 10/2015 | Wu | H02M 7/48 |
| 9,257,845 B2 * | 2/2016 | Alonso Sadaba | F03D 7/0284 |
| 9,318,988 B2 * | 4/2016 | Larsen | F03D 7/00 |
| 2005/0046196 A1 | 3/2005 | Larsen | |
| 2010/0094474 A1 * | 4/2010 | Larsen | F03D 9/003 |
| | | | 700/287 |
| 2010/0134076 A1 * | 6/2010 | Cardinal | G05F 1/70 |
| | | | 323/207 |
| 2012/0112551 A1 * | 5/2012 | Li | H02J 3/386 |
| | | | 307/82 |
| 2014/0159367 A1 * | 6/2014 | Yin | F03D 7/028 |
| | | | 290/44 |
| 2014/0175887 A1 * | 6/2014 | Shao | H02J 3/16 |
| | | | 307/72 |
| 2014/0350743 A1 * | 11/2014 | Asghari | G05B 13/048 |
| | | | 700/297 |
| 2016/0268940 A1 * | 9/2016 | Achilles | H02J 3/1842 |

\* cited by examiner

SYSTEM AND METHOD FOR IMPROVED REACTIVE POWER SPEED-OF-RESPONSE FOR A WIND FARM

FIELD OF THE INVENTION

The present disclosure relates generally to wind power generation and, more particularly, to systems and methods for controlling reactive power speed-of-response for a wind farm.

BACKGROUND OF THE INVENTION

Wind power is considered one of the cleanest, most environmentally friendly energy sources presently available and wind turbines have gained increased attention in this regard. A modern wind turbine typically includes a tower, a generator, a gearbox, a nacelle, and one or more rotor blades. The rotor blades are the primary elements for converting wind energy into electrical energy. The blades typically have the cross-sectional profile of an airfoil such that, during operation, air flows over the blade producing a pressure difference between its sides. Consequently, a lift force, which is directed from the pressure side towards the suction side, acts on the blade. The lift force generates torque on the main rotor shaft, which is connected to a generator for producing electricity that is transferred to a power grid. The power grid transmits electrical energy from generating facilities to end users.

Wind power generation is typically provided by a wind farm, which contains a plurality of wind turbine generators (often 100 or more). Individual wind turbine generators can provide important benefits to power system operation related to mitigation of voltage flicker caused by wind gusts and mitigation of voltage deviations caused by external events.

In a wind farm setting, each wind turbine generator can experience a unique wind force. Therefore, each wind turbine generator typically includes a local controller to control the response to wind gusts and other external events. Prior art wind farm control has generally been based on one of two architectures: (1) local control with constant power factor or reactive power combined with farm-level control in voltage control, or (2) local control in constant voltage control with no farm-level control.

Local control with constant power factor and farm-level control in voltage control requires fast communications with aggressive action from the farm-level to the local level. If the farm-level control is inactive, the local control can aggravate voltage flicker. With constant voltage control on each generator, steady-state operation varies significantly with small deviations in loading on the transmission grid. This causes the wind turbine generators to encounter limits in steady-state operation that prevent a response to disturbances, thereby resulting in a loss of voltage regulation. Because reactive current is higher than necessary during this mode of operation, overall efficiency of the wind turbine generator decreases.

U.S. Pat. No. 7,224,081 describes a voltage control method and system for wind turbines wherein a reactive power regulator controls reactive power production of individual wind turbines in a wind farm by adjusting the voltage setpoint to a voltage regulator. This scheme relies on receipt of a reactive power command to each wind turbine generator. At the individual wind turbine level, a fast voltage regulator holds the wind turbine low-voltage side to a setpoint, which is adjusted by the reactive power regulator to follow the command from the wind farm control. The reactive power regulator has a first time constant that is numerically greater than a time constant of the voltage regulator. This control scheme is beneficial in that it forces all wind turbines within the wind farm to have the same reactive power output. Also, if the wind farm-level control is off, then the wind turbines all stay at a preset reactive power output even if the grid voltage varies. The wind farm controller, however, must also act through the time constant of the reactive power regulator.

Accordingly, the art is continuously seeking new and improved system and methods that provide fast voltage regulator response with stable operation.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for improving reactive power speed-of-response in a wind farm connected to a power grid. The method includes receiving, by a wind farm controller, a voltage feedback from the power grid and a voltage reference. Another step includes calculating a linear voltage error as a function of the voltage feedback and the voltage reference. The method also includes generating a first output based on the linear voltage error via a first control path having a first voltage regulator. Further steps include determining a first non-linear voltage error based on the linear voltage error via a second control path having a second voltage regulator and generating, via the second control path, a second output based on the first non-linear voltage error. The method then includes generating a reactive power command as a function of the first and second outputs.

In one embodiment, the step of determining the non-linear voltage error based on the linear voltage error further includes providing a deadband in the second control path and determining the non-linear voltage error via the deadband. In another embodiment, the method also includes determining a second non-linear voltage error based on the linear voltage error via a transient amplifier. In further embodiments, the first and second voltage regulators may include at least one of a proportional controller, a proportional integral controller, a proportional derivative controller, a proportional integral derivative controller, a state space controller, or similar. For example, in certain embodiments, the first voltage regulator may be a proportional integral controller and the second voltage regulator may be a proportional controller.

In further embodiments, the method may also include adjusting at least one time constant of the second voltage regulator so as to stabilize the second output of the second control path. In additional embodiments, the method may further include limiting the first voltage regulator (e.g. a proportional integral controller) based on predetermined integral limits and limiting the reactive power command based on predetermined command limits, wherein the predetermined command limits are greater than the predetermined integral limits.

In further embodiments, the first voltage regulator may be associated with a first state variable and the second voltage regulator may be associated with one or more second state variables. As such, in particular embodiments, the method may include determining a derivative of one or more of the second state variables and controlling the regulators based on the derivative(s). More specifically, the method may include maintaining or freezing the first state variable and the one or more second state variables at their present values for as long as the derivative(s) of the second state variable is negative, the second state variable(s) is negative, and the first or second non-linear voltage error is negative. In addition, the method may include maintaining the first state variable and the one or more second state variables at their present values for as long as the derivative(s) of the second state variable is negative, the second state variable(s) is positive, and the first or second non-linear voltage error is positive.

In additional embodiments, the method may include maintaining or freezing the first state variable and the one or more second state variables at their present values for as long as the voltage feedback is outside of a predetermined voltage range.

In another embodiment, the method may include determining one or more voltage regulator parameters for the first and second voltage regulators. For example, in certain embodiments, the voltage regulator parameters may include proportional gains, integral gains, time constants, combinations thereof, or similar. Further, in particular embodiments, the method may include varying the voltage regulator parameters based on a number of online wind turbines in the wind farm and/or a status of one or more external devices to the wind farm. The external devices, for example, may include transmission lines, generators, etc.

In another aspect, the present subject matter is directed to a method for improving reactive power speed-of-response in a power system connected to a power grid. More particularly, the method includes determining, via a non-linear voltage regulator, a non-linear voltage error as a function of a linear voltage error. Another step includes calculating a non-linear time constant as a function of at least one of the non-linear voltage error or history of the non-linear voltage regulator. The method also includes determining an output of the non-linear voltage regulator based on the non-linear voltage error, a non-linear gain parameter, and/or the non-linear time constant.

In yet another aspect, the present disclosure is directed to a voltage control system. The voltage control system includes a first control path and second control path. The first control path is configured to calculate a linear voltage error as a function of at least one of a voltage feedback or a voltage reference. Further, the first control path includes a first voltage regulator configured to generate a first output based on the linear voltage error. The second control path includes a second voltage regulator having a deadband. The deadband is configured to determine a first non-linear voltage error based on the linear voltage error. Further, the second voltage regulator is configured to generate a second output based on the first non-linear voltage error. As such, the voltage control system is further configured to generate a reactive power command as a function of the first and second outputs.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
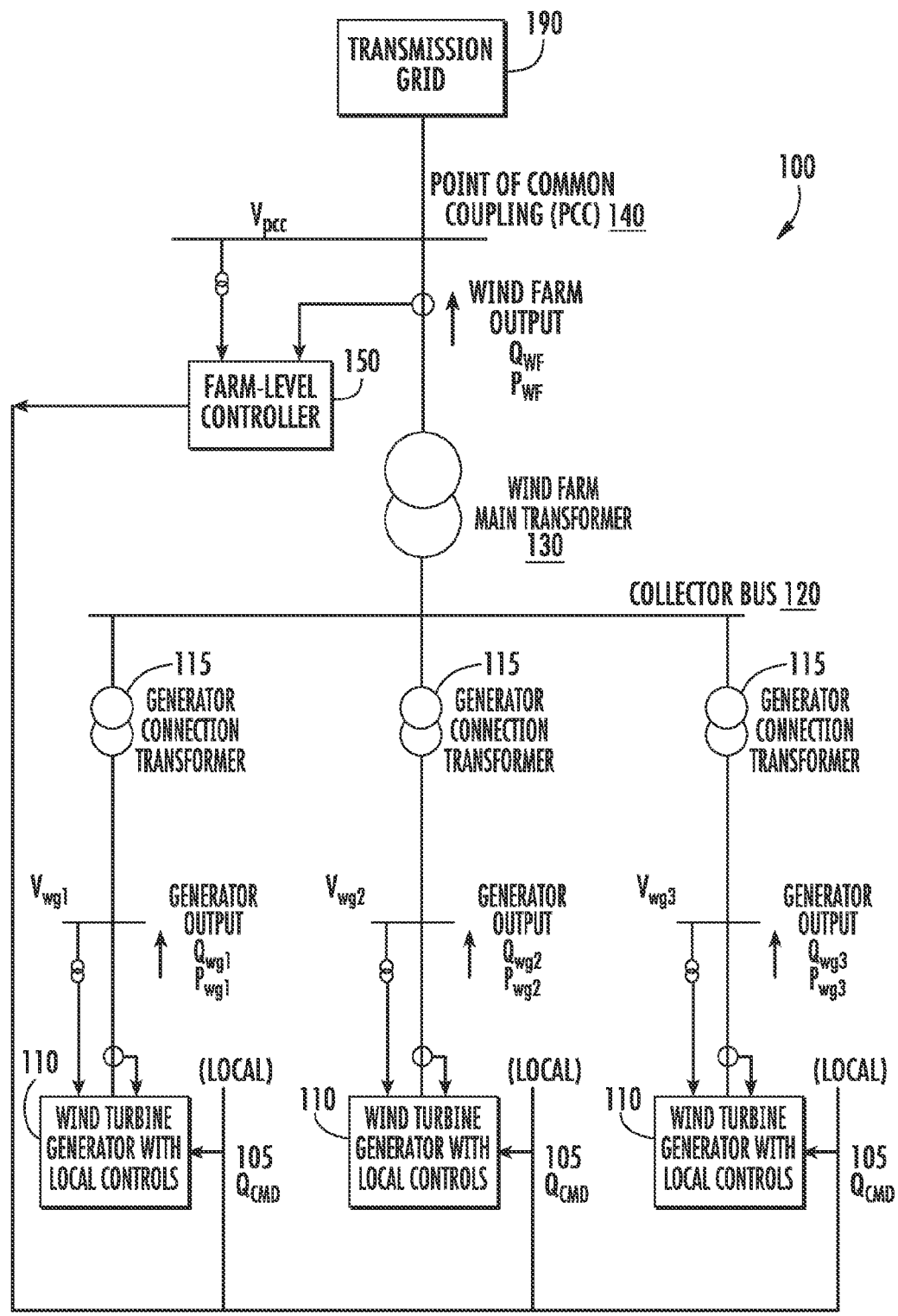
FIG. 1 illustrates a block diagram of a wind farm having multiple wind turbine generators coupled with a transmission grid according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a non-linear farm controller that sends a reactive power command to all of the wind turbine generators within a wind farm or substation. More specifically, the controller includes a non-linear voltage control system or regulator that regulates reactive power in a wind farm connected to a power grid so as to improve reactive speed-of-response of the wind farm. Accordingly, the voltage control system calculates a linear voltage error as a function of a voltage feedback from the power grid and a voltage reference and generates a first output based on the linear voltage error via a first control path having a first voltage regulator. In addition, the voltage control system determines one or more non-linear voltage errors based on the linear voltage error via a second control path having a second voltage regulator. The system then generates a second output via the second control path based on the non-linear voltage error. As such, the voltage control system generates a reactive power command as a function of the first and second outputs that provides improve reactive power speed-of-response.

It should be appreciated that the reactive power command may be generated by any field-level (i.e., higher-than-generator-level) controller, such as a substation controller or a wind farm-level controller. For description purposes, embodiments are described herein with respect to a wind farm, wherein a plurality of wind turbines are in communication with the wind farm controller.

The present system and method provides many advantages not present in the prior art. For example, the control scheme of the present disclosure provides faster reactive power response to grids requiring stabilization. More specifically, the non-linear control algorithm reduces the response time of a wind farm to reactive power unbalances in the transmission system. As such, the algorithm allows for fast and stable voltage control. Further, the voltage control system of the present disclosure increases the amount of wind generation that can be reliably connected to a given utility system and avoids the need for additional infrastructure within wind farms to meet the required reactive response.

Although the present technology described herein is explained with reference to a wind farm having a plurality of wind turbine generators, it should be understood that the present technology may also be implemented for any suitable application having the ability to rapidly control reactive power. For example, further non-limiting examples includes solar systems, energy storage systems, static VAR systems, STATCOMs, and/or similar.

Referring now to the drawings, FIG. 1 illustrates a block diagram of a wind farm 100 having multiple wind turbine generators 110 coupled with a transmission grid 190. FIG. 1 illustrates three wind generators 110; however, any number of wind generators can be included in a wind farm. Each wind turbine generator 110 includes a local controller that is responsive to the conditions of the wind turbine generator being controlled. In one embodiment, the controller for each wind turbine generator senses only the terminal voltage and current (via potential and current transformers). The sensed voltage and current are used by the local controller to provide an appropriate response to cause the wind turbine generator 110 to provide the desired reactive power.

Each wind turbine generator 110 is coupled to collector bus 120 through generator connection transformers 115 to provide real and reactive power (labeled $P_{wg}$ and $Q_{wg}$, respectively) to collector bus 120. Generator connection transformers and collector buses are known in the art.

The wind farm 100 provides real and reactive power output (labeled $P_{wf}$ and $Q_{wf}$ respectively) via wind farm main transformer 130. The farm-level controller 150 senses the wind farm output, as well as the voltage at the point of common coupling (PCC) 140, to provide a Q command signal 105 ($Q_{CMD}$) that indicates desired reactive power at the generator terminals to ensure a reasonable distribution of reactive power among the wind turbines. In alternate embodiments, this Q command signal ($Q_{CMD}$) 105 may be generated as the local or operator level (indicated by the "Local" line in FIG. 1), for example in the event that the wind turbine generator is in manual mode or otherwise not in communication with the wind farm controller 150, as explained in greater detail below.

Figure 2:
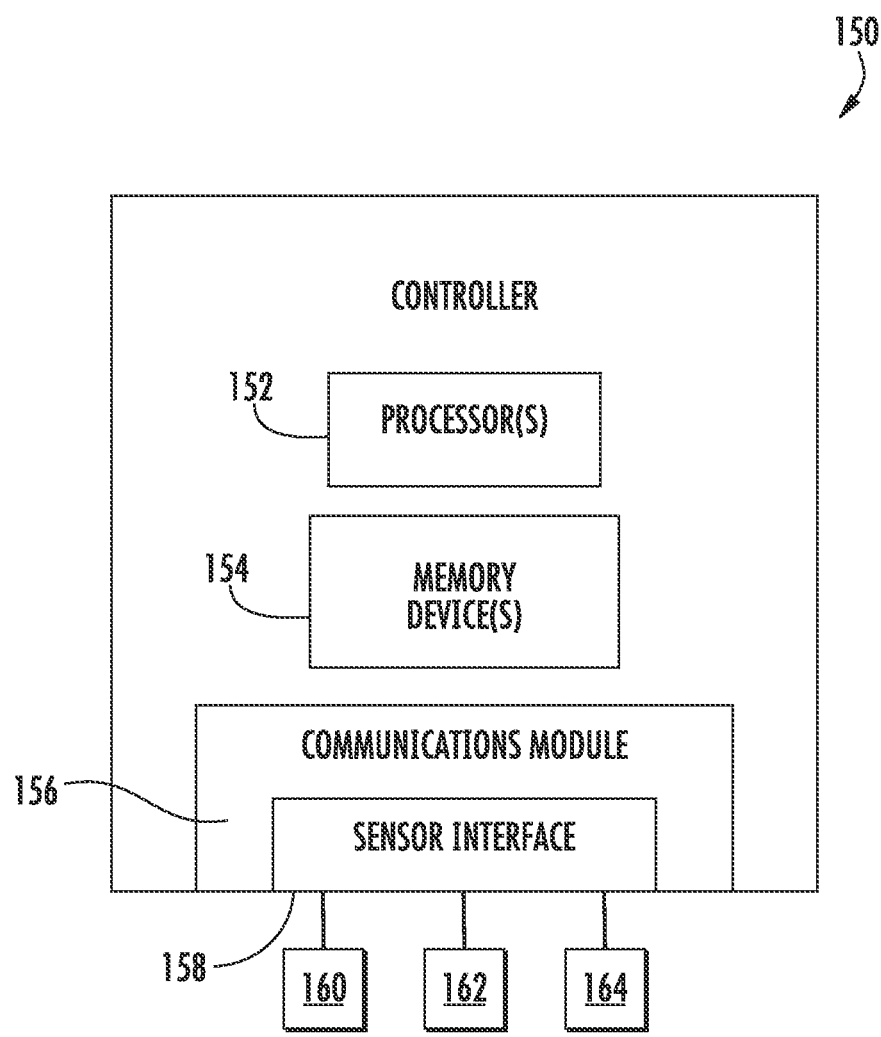
FIG. 2 illustrates a block diagram of suitable components that may be included in one embodiment of a farm controller according to the present disclosure.

Referring now to FIG. 2, a block diagram of one embodiment of suitable components that may be included within the farm controller 150 and/or the turbine controller(s) in accordance with aspects of the present disclosure is illustrated. As shown, the controller 150 may include one or more processor(s) 152 and associated memory device(s) 154 configured to perform a variety of computer-implemented functions (e.g., performing the methods, steps, calculations and the like and storing relevant data as disclosed herein). Additionally, the controller 150 may also include a communications module 156 to facilitate communications between the controller 150 and the various components of the wind farm 100. Further, the communications module 156 may include a sensor interface 158 (e.g., one or more analog-to-digital converters) to permit signals transmitted from one or more sensors 160, 162, 164 to be converted into signals that can be understood and processed by the processors 152. It should be appreciated that the sensors 160, 162, 164 may be communicatively coupled to the communications module 156 using any suitable means. For example, as shown, the sensors 160, 162, 164 are coupled to the sensor interface 158 via a wired connection. However, in other embodiments, the sensors 160, 162, 164 may be coupled to the sensor interface 158 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 154 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 154 may generally be configured to store suitable computer-readable instructions that, when implemented by the processor(s) 152, configure the controller 150 to perform various functions as described herein.

The sensors 160, 162, 164 may include any suitable sensors configured to provide feedback measurements to the farm controller 150. In various embodiments, for example, the sensors 160, 162, 164 may be any one of or combination of the following: voltage sensors, current sensors, and/or any other suitable sensors.

Figure 3:
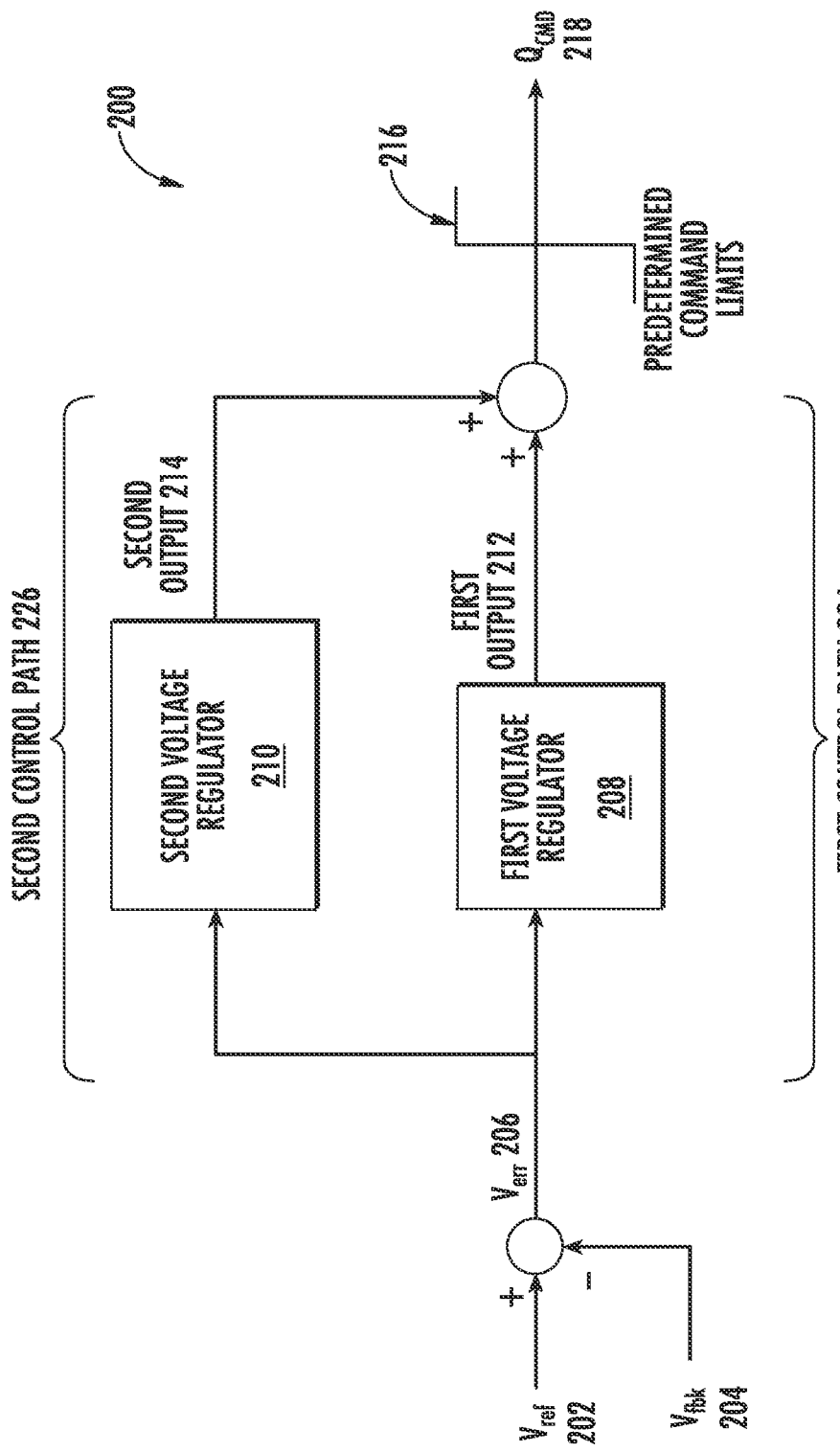
FIG. 3 illustrates a simplified, block diagram of one embodiment of a voltage control system according to the present disclosure.
Figure 4:
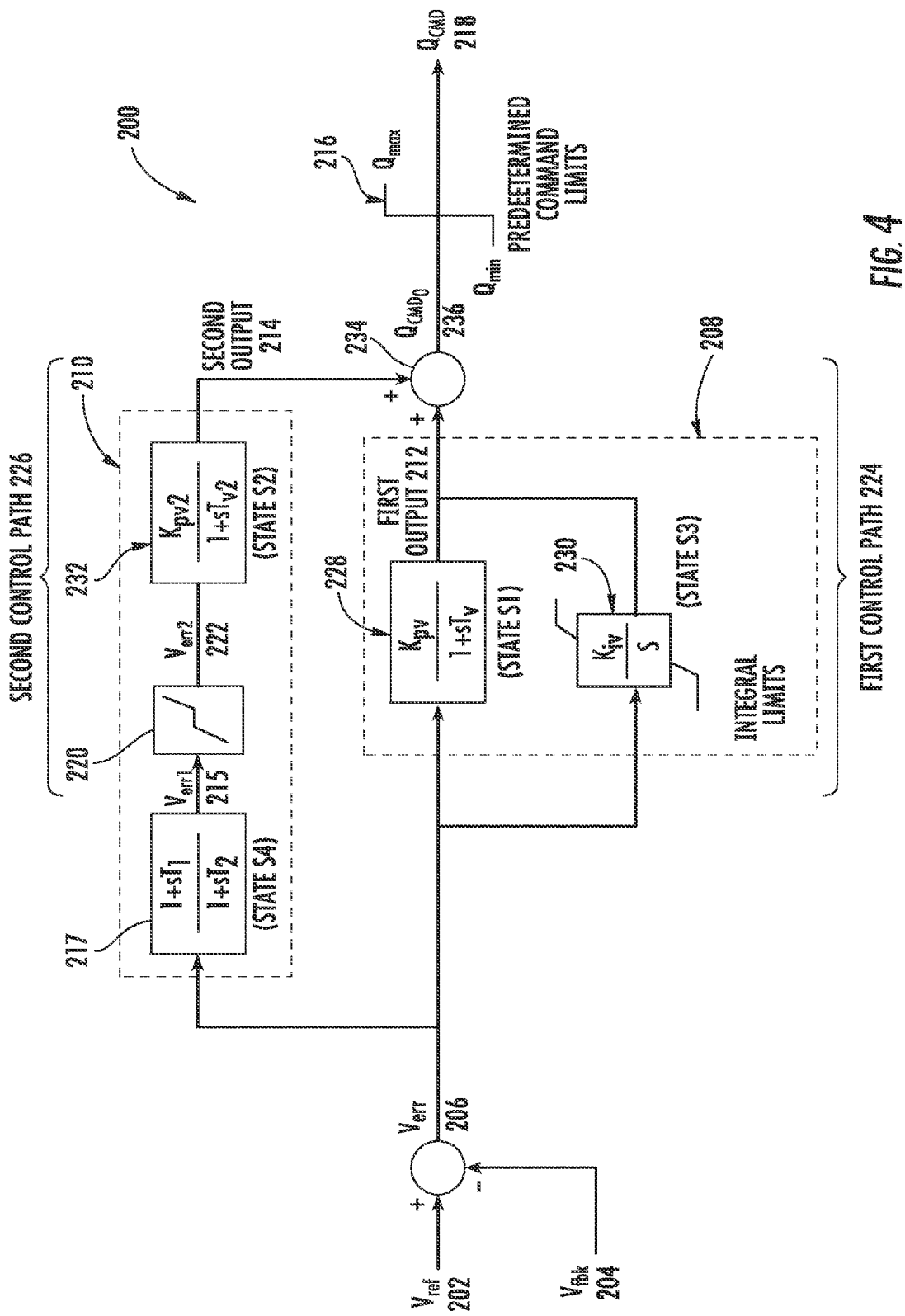
FIG. 4 illustrates a detailed, block diagram of one embodiment of a voltage control system according to the present disclosure, particularly illustrating further aspects of the first and second control paths.

Referring now to FIGS. 3 and 4, the farm controller 150 as described herein includes a voltage control system 200 configured to improve reactive power speed-of-response of the wind farm 100. As used herein, the voltage control system 200 generally describes any suitable voltage regulator that is configured to regulate and/or stabilize voltage levels used by the processor(s) 152 of other elements of the farm controller 150. More specifically, FIG. 3 illustrates a simplified, block diagram of one embodiment of the voltage control system 200 according to the present disclosure; whereas FIG. 4 illustrates a detailed, block diagram of another embodiment of the voltage control system 200, particularly illustrating further details of the control paths. As shown, the voltage control system 200 receives a voltage feedback signal 204 ($V_{fbk}$) from the power grid 190 as well as a voltage reference signal 202 ($V_{ref}$). The voltage reference signal 202 may be any suitable voltage reference determined by the farm controller 150 or input manually by an operator. The voltage feedback signal 204 is indicative of the actual voltage of the power grid 190. Accordingly, as shown, the voltage control system 200 determines a linear voltage error signal 206 ($V_{err}$) as a function of the voltage feedback signal 204 and the voltage reference signal 202.

For example, in one embodiment, the difference between the voltage feedback signal 204 and the voltage reference signal 202 is the linear voltage error signal 206, which can ultimately be reduced by the voltage control system 200 to cause the feedback voltage 204 to follow the reference voltage 202.

Based on the linear voltage error signal 206, the voltage control system 200 generates a reactive power command (e.g. $Q_{CMD}$), which is used to improve reactive power speed-of-response of the wind farm 100. More specifically, the voltage control system 200 generates a first output 212 based on the linear voltage error 206 via a first control path 224 having a first voltage regulator 208. For example, as shown in FIG. 4, the first voltage regulator 208 may be a proportional integral (PI) controller that has a closed-loop time constant in the range of 0.5 to 10 seconds (e.g. 3 seconds, 5 seconds, 5.5 seconds). In additional embodiments, other types of controllers can also be used, for example, proportional derivative (PD) controllers, a proportional integral derivative (PID) controllers, state space controllers, or similar. Other time constants can be used as well. The PI controller 208 includes a proportional path and an integral path. The proportional path includes a first proportional integrator 228 that is associated with a filtering element having a bandwidth typically greater than the closed-loop bandwidth of the windfarm voltage control system. Further, the integral path includes a second integrator 230. In certain embodiments, the PI controller 208 can be limited based on predetermined integral limits as shown. Further, each of the integrators 228, 230 are associated with a state variable, namely S1 and S3, respectively. As used herein, a state variable generally refers to a variable that is used to describe the mathematical "state" of a dynamic system, e.g. the integrators 228, 230.

Still referring to FIGS. 3 and 4, the voltage control system 200 also generates a second output 214 via a second control path 226 having a second voltage regulator 210. More specifically, as shown in FIG. 4, the second voltage regulator 210 may include a transient amplifier 217 and a deadband 220 followed by a filtered proportional path having an integrator 232 that is associated with the filtering state variable S2. As used herein, a deadband encompasses its broad ordinary meaning and generally refers to a component of a voltage regulator having an interval of a signal domain wherein no action occurs. As such, a deadband typically prevents oscillation or hunting in proportional control systems.

Accordingly, the transient amplifier 217 is associated with a certain transfer function, for example, $1+sT_1/1+sT_2$, wherein $T_1$ and $T_2$ are time constants and s is state variable S4. More specifically, the transient amplifier 217 is configured to amplify fast voltage changes in the power grid 190 so as to generate non-linear voltage error 215 (e.g. $V_{err1}$). The deadband 220 can then determine another non-linear voltage error 222 ($V_{err2}$) as a non-linear function of the voltage error signal 215.

Further, as shown, the integrator 232 may be associated with the filtering element in the filtered proportional controller. Other types of controllers can also be used, for example, proportional integral (PI) controllers, proportional derivative (PD) controllers, a proportional integral derivative (PID) controllers, state space controllers, or similar. For example, in certain embodiments, the second voltage regulator 210 may be configured to generate the second output 214 using, for example, a hysteresis function. More specifically, in particular embodiments, the second voltage regulator 210 may be configured to determine a non-linear time constant (e.g. $T_1$, $T_2$, and/or $T_{v2}$) as a function of the voltage errors, namely $V_{err1}$ 215, $V_{err}$ 206 and $V_{err2}$ 222, and/or past history of the non-linear integrator 232. Accordingly, the integrator 232 is configured to calculate the second input 214 as a function of the non-linear voltage error 222, the proportional gain $K_{pv2}$, and/or the time constant $T_{v2}$. If the linear voltage error 206 is high, the non-linear voltage error 222 will move fast and provide improved reactive power speed-of-response. However, the increased speed can cause instability in the power grid 190. As such, the voltage control system 200 is also configured to provide stable grid control using various suitable control algorithms. For example, in certain embodiments, the integrator 232 is configured to adjust the time constant $T_{v2}$, so as to provide stable grid control, which is discussed in more detail below in regards to FIG. 9. As such, the second output 214 can be updated using the non-linear voltage error 222, the non-linear gain parameter $K_{pv2}$, and/or the adjusted non-linear time constant $T_{v2}$.

In further embodiments, the integrator 232 is also configured to determine a derivative of the second state variable S2. If the second state variable S2 and the derivative of the second state variable S2 are negative and the non-linear voltage error 222 is negative, the voltage control system 200 is configured to maintain or freeze the state variables (e.g. S1, S2, S3, and/or S4) at their present values for as long as the conditions are satisfied. In addition, the voltage control system 200 is configured to maintain or freeze the state variables at their present values for as long as the second state variable S2 is positive, the derivative of the second state variable S2 is negative, and the non-linear voltage error 222 is positive.

In alternative embodiments, the voltage control system 200 may maintain or freeze the state variables at their present values if the voltage feedback 204 is outside of a predetermined voltage range. The predetermined voltage range may be any suitable range. For example, in certain embodiments, the predetermined voltage range may be from about 70% to about 110% of a nominal voltage. The previous conditions, when satisfied, indicate that a temporary, abnormal voltage condition is occurring in the power grid. As such, the voltage control system 200 is configured to freeze the integrators until the condition passes so as to prevent forcing an extended abnormal voltage condition while the integrators respond after the originating grid disturbance is removed external to the wind farm 100. Accordingly, when the grid returns to within the normal range of operation, the voltage control system 200 provides fast reactive power response to the power grid 190 in a smooth manner.

More specifically, as shown at 234, the voltage control system 200 is configured to combine the first and second outputs 212, 214 from the first and second control paths 224, 226 to obtain a reactive power output signal (e.g. $Q_{CMDO}$ 236). The $Q_{CMDO}$ 236 signal can be optionally limited by limiter 216 to a predetermined range between $Q_{min}$ and $Q_{max}$ (i.e. predetermined command limits) before sending the signal to each of the wind turbine generators 110. In one embodiment, for example, $Q_{min}$ and $Q_{max}$ are set equal to the rated reactive capability of the wind turbine generators 110. Alternate limits can also be used. Thus, the voltage control system 200 generates the reactive power command (e.g. $Q_{CMD}$ 218) as a function of the $Q_{CMDO}$ signal 236. The $Q_{CMD}$ signal 218 is reactive power command generated by the farm controller 150 that is sent to each of the wind turbine generators 110 to provide improved reactive power speed-of-response. Further, the reactive power command 218 is transmitted to the local controllers of the wind turbine generators 110 for generating reactive power based on the commands.

As mentioned, in certain embodiments, the voltage control system 200 is configured to limit the first voltage regulator 208 based on the predetermined integral limits as shown. In addition, the limiter 216 is configured to limit the $Q_{CMDO}$ signal 236 based on the predetermined command limits (e.g. $Q_{min}$ and $Q_{max}$). As such, in particular embodiments, the predetermined command limits of the limiter 216 can be greater or wider than the predetermined integral limits of integrator 230. This can be beneficial for wind turbine generators 110 having temporary capability beyond their steady-state rating. For example, the limits on integrator 230 could be set to the steady-state rating of the wind turbine generators 110, ensuring that steady-state operation would be within their capability. The limits on the final output 218 would be set to the temporary capability of the wind turbine generators 110, thereby enabling the wind farm controller 150 to benefit from the higher wind turbine capability to manage grid transients.

In one embodiment, all of the limits discussed with respect to FIGS. 3 and 4 are non-windup limits; however, in alternate embodiments, a subset of the limits can be non-windup limits. The limits have been discussed in terms of fixed parameters; however, dynamically variable parameters provided by, for example, a lookup table or a processor or state machine executing a control algorithm can provide the limits. Such a dynamically variable limit may be based upon a current rating of the generators 110 and a contemporaneous real power output of the wind farm 100.

Figure 5:
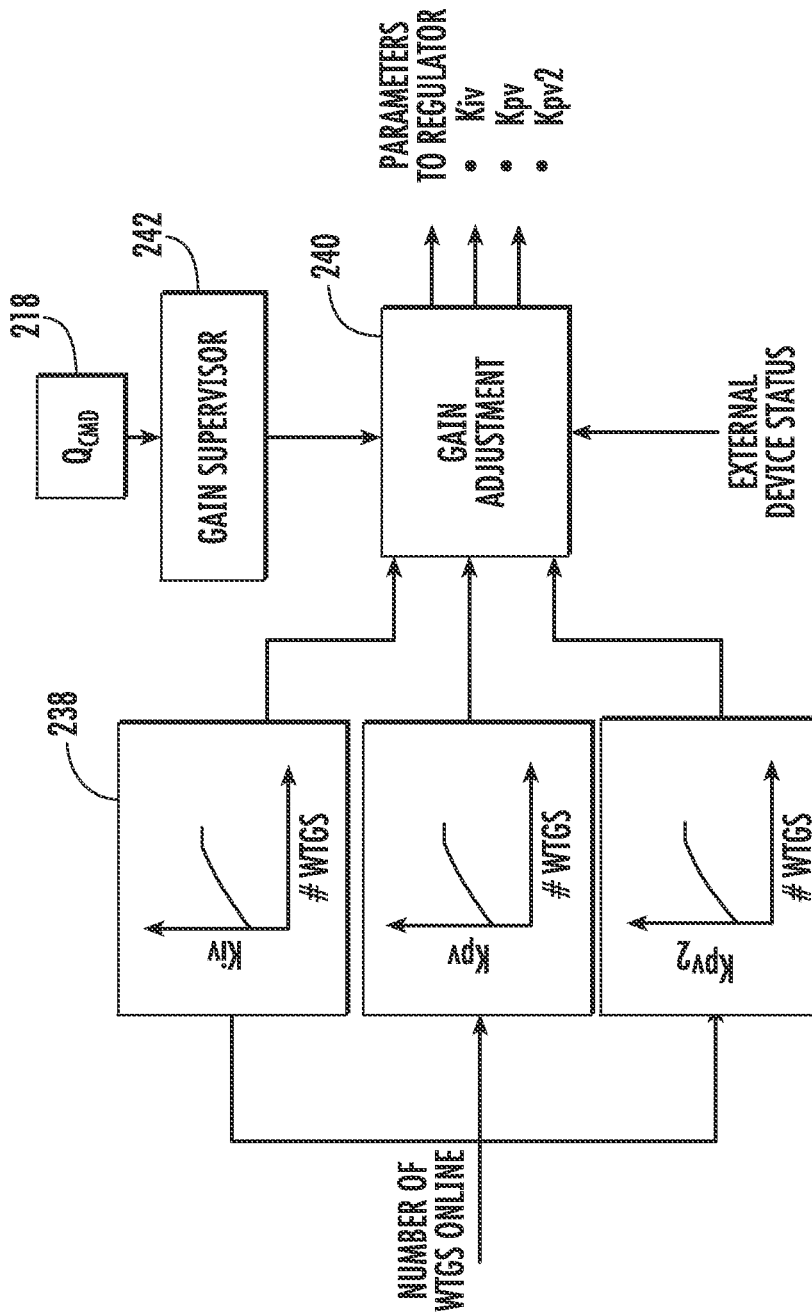
FIG. 5 illustrates a block diagram of one embodiment of a parameter adaption control scheme that can be implemented by the farm controller according to the present disclosure.

Referring now to FIGS. 4 and 5, the farm controller 150 may also determine one or more voltage regulator parameters for the integrators 228, 230, 232. For example, in certain embodiments, the voltage regulator parameters may include proportional gains (e.g. $K_{pv2}$, $K_{pv}$), integral gains (e.g. $K_{iv}$), time constants (e.g. $T_1$, $T_2$, $T_v$, $T_{v2}$), combinations thereof, or similar. Further, in certain embodiments, the farm controller 150 may be configured to vary or adjust the voltage regulator parameters based on a number of online wind turbines in the wind farm 100 and/or a status of one or more devices external to the wind farm 100. The external devices, for example, may include transmission lines, generators, etc. Further, as shown, the farm controller 150 receives a number of wind turbine generators online and inputs the number into one or more parameter graphs 238. Based on the graphs 238, the farm controller 150 can determines a gain adjustment 240 that can be sent to the voltage control system 200 to update the parameters. More specifically, as shown, the gain adjustment 240 may receive a status of one or more external devices. Additionally, a gain supervisor 242 may be included that monitors the control signals for sustained oscillatory behavior that may be due to excessive response from the wind farm controller 150 in some unanticipated grid condition. As such, the gain supervisor 242 initiates a gain reduction to restore stability to the wind farm control. Such gain supervisor functions are known in the art. The inputs of the gain supervisor 242 may vary, but generally include control signals such as the final output of the controller 150 (e.g. $Q_{CMD}$ 218), the voltage feedback signal 204 from the grid 190, and/or a combination of such signals or similar.

Figure 6:
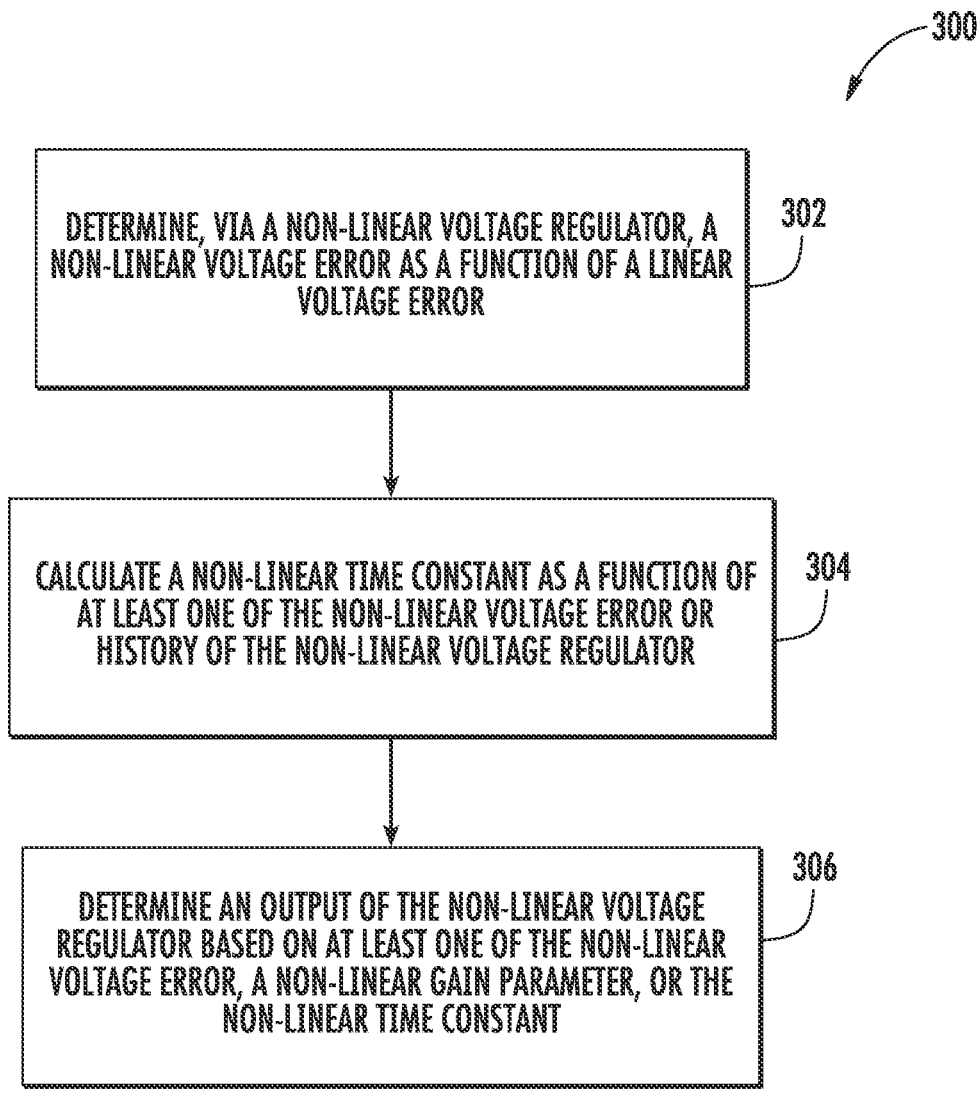
FIG. 6 illustrates a flow diagram of one embodiment of a method for improving reactive power speed-of-response in a wind farm connected to a power grid according to the present disclosure.

Referring now to FIG. 6, a flow diagram of one embodiment of a method 300 for improving reactive power speed-of-response in a power system connected to a power grid is illustrate. More particularly, at 302, the method 300 includes determining, via a non-linear voltage regulator, a non-linear voltage error as a function of a linear voltage error. At 304, the method 300 includes calculating a non-linear time constant as a function of at least one of the non-linear voltage error and/or history of the non-linear voltage regulator. At 306, the method 300 includes determining an output of the non-linear voltage regulator based on at least one of the non-linear voltage error, a non-linear gain parameter, or the non-linear time constant.

Figure 7:
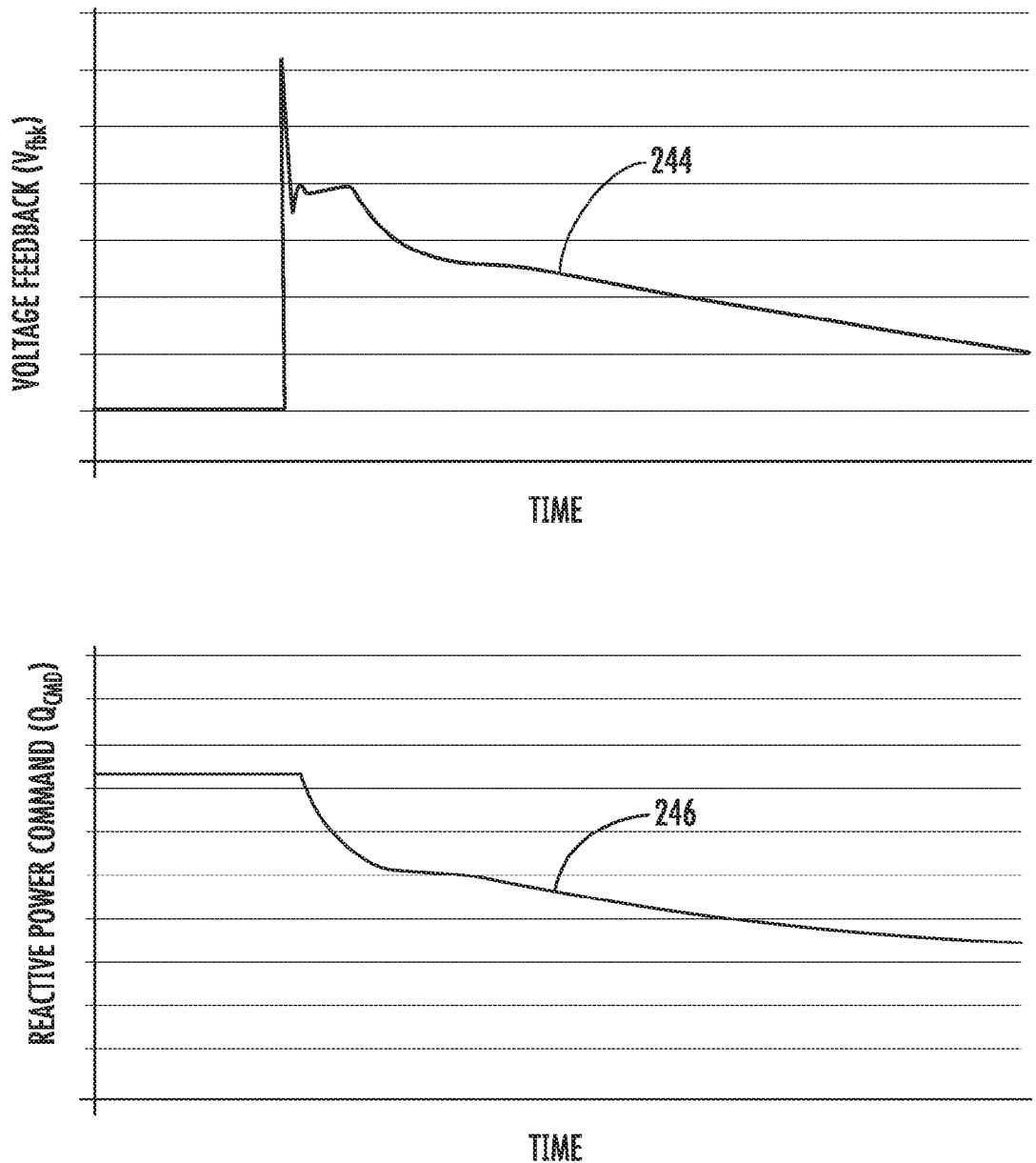
FIG. 7 illustrates various graphs of reactive power and voltage versus time, respectively, according to conventional construction.
Figure 8:
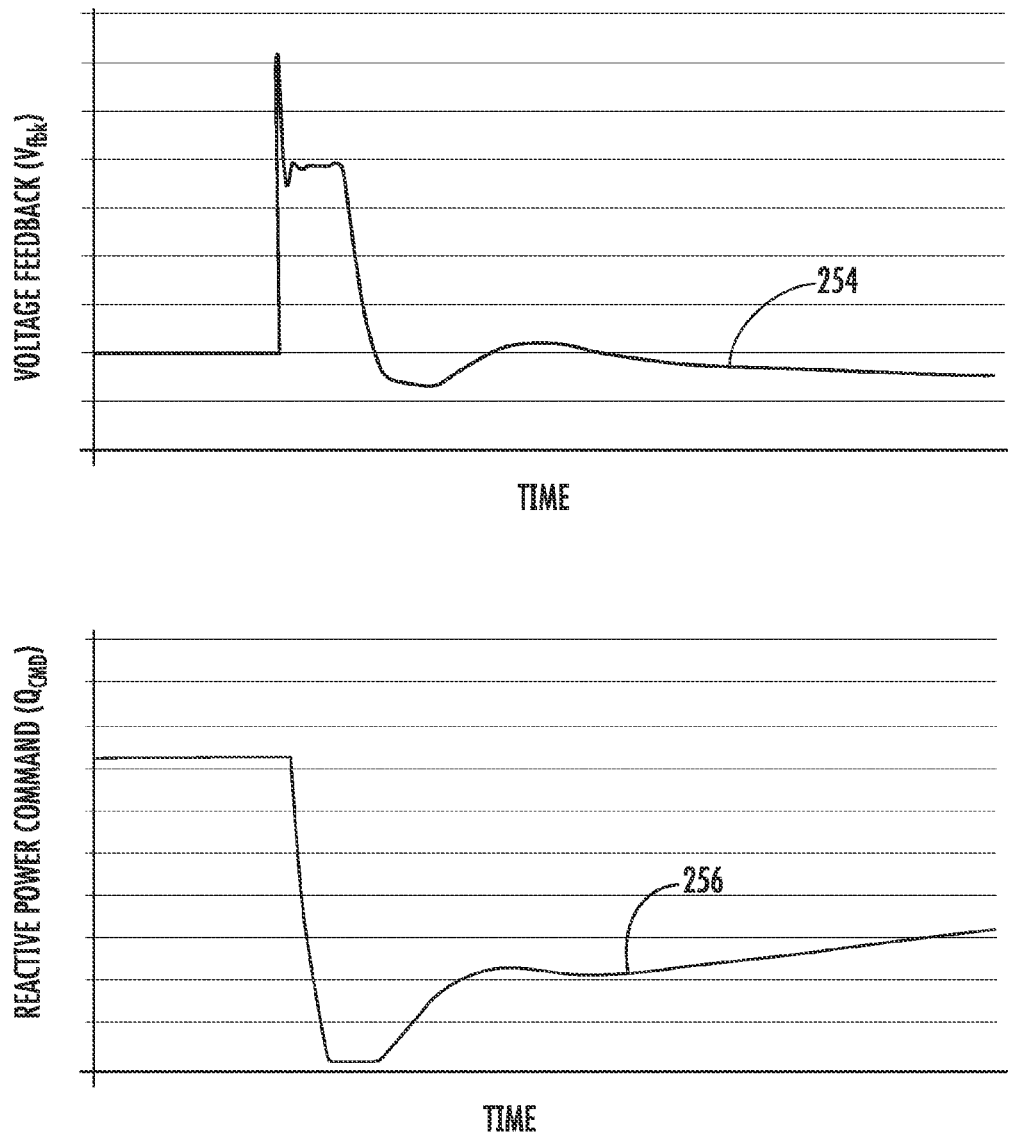
FIG. 8 illustrates various graphs of reactive power and voltage versus time, respectively, according to the present disclosure.
Figure 9:
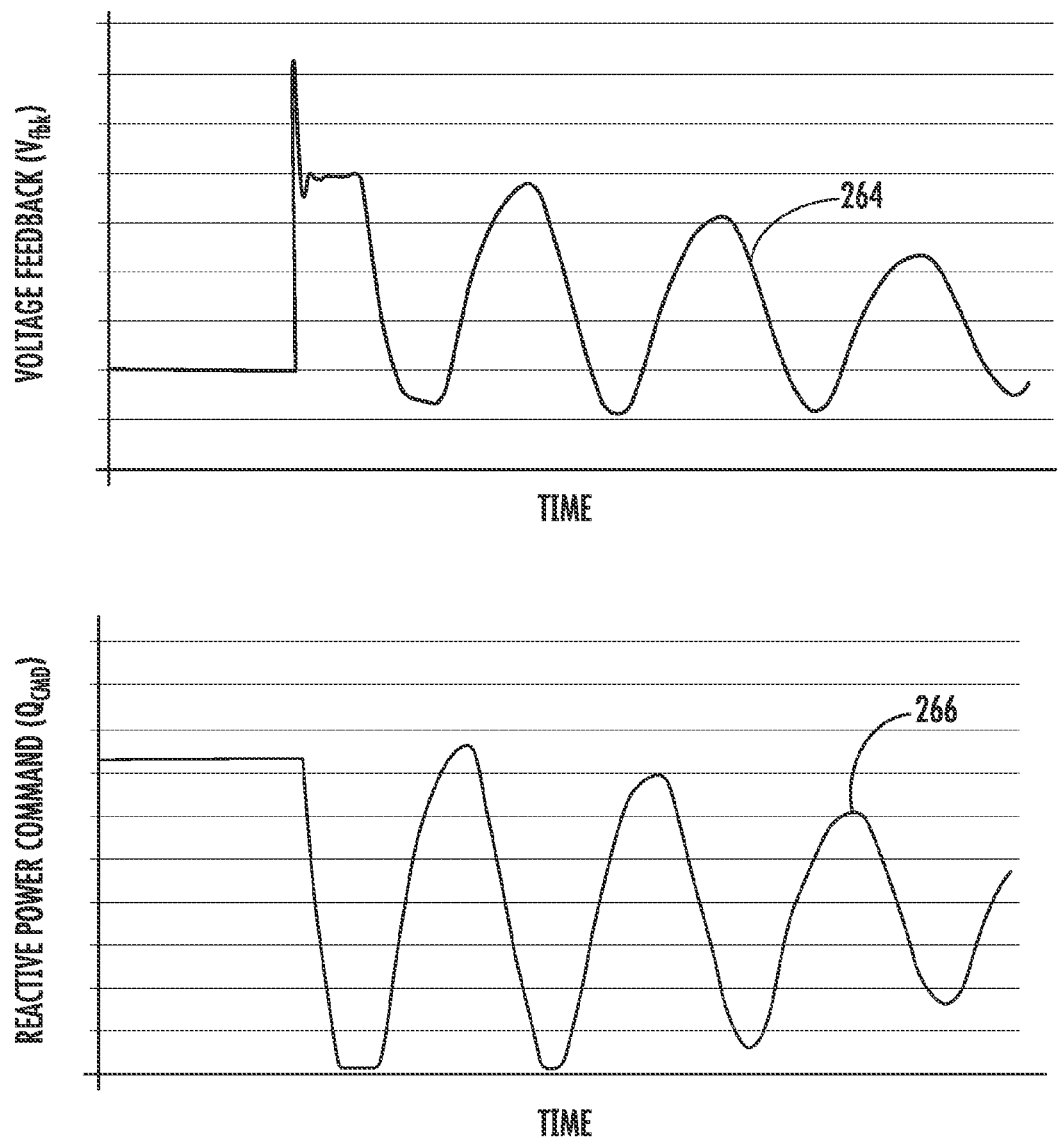
FIG. 9 illustrates various graphs of reactive power and voltage versus time, respectively, particularly illustrating the effects of implementing only a portion of the present disclosure.

Referring now to FIGS. 7-9, various advantages of operating the wind farm according to the present disclosure are illustrated. More specifically, FIGS. 7-9 illustrate the response of voltage (e.g. $V_{fbk}$) and reactive power command (e.g. $Q_{CMD}$) versus time to a capacitor operation in the transmission grid 190. The capacitor operation causes the voltage $V_{pcc}$ at the PCC 140 to increase. The voltage feedback signal 204 of the voltage control system 200 consequently increases. As such, FIGS. 7-9 illustrate how the voltage control system 200 modifies the reactive power command (e.g. $Q_{CMD}$) to bring the voltage feedback signal 204 close to the initial value.

More specifically, FIG. 7 illustrates multiple graphs of voltage (e.g. $V_{fbk}$) and reactive power command (e.g. $Q_{CMD}$) versus time, respectively, for prior art systems, whereas FIG. 8 illustrates multiple graphs of voltage (e.g. $V_{fbk}$) and reactive power command (e.g. $Q_{CMD}$) versus time, respectively, according to the present disclosure. FIG. 9 illustrates the effects of the non-linear control path but without the time constant (e.g. $T_{v2}$) adjustment technology. As shown in FIG. 7, the reactive power response 246 for prior art wind farms requires a certain period of time to reduce the reactive power command 246 and cause the voltage feedback 244 to approximate the value before the capacitor operation. In contrast, as shown in FIG. 8, the reactive power response 256 for the wind farm 100 of the present disclosure has a faster reduction and results in a fast and stable restoration of the voltage feedback to its initial value. Further, as shown in FIG. 9, the graphs illustrate the behavior of the voltage feedback and reactive power signals 264, 266 without the adjustments of the integrator of state variable S2 in the block 232 of the second control path 226. It can be observed that the initial reduction of the reactive power command is the same as in FIG. 8. After the initial reactive power command reduction, an oscillatory response is observed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for improving reactive power speed-of-response in a wind farm connected to a power grid, the method comprising:

receiving, by a wind farm controller, a voltage feedback from the power grid;

receiving, by the wind farm controller, a voltage reference;

calculating a linear voltage error as a function of the voltage feedback and the voltage reference;

generating a first output based on the linear voltage error via a first control path having a first voltage regulator;

determining a first non-linear voltage error based on the linear voltage error via a deadband of a second voltage regulator of a second control path;

generating, via the second control path, a second output based on the first non-linear voltage error; and, generating a reactive power command as a function of the first and second outputs.

2. The method of claim 1, further comprising determining a second non-linear voltage error based on the linear voltage error via a transient amplifier.

3. The method of claim 1, wherein the first voltage regulator comprises a proportional integral controller and the second voltage regulator comprises a proportional controller.

4. The method of claim 1, further comprising adjusting a time constant of the second voltage regulator so as to stabilize the second output of the second control path.

5. The method of claim 1, further comprising limiting the first voltage regulator based on predetermined integral limits and limiting the reactive power command based on predetermined command limits, wherein the predetermined command limits are greater than the predetermined integral limits.

6. The method of claim 1, wherein the first voltage regulator is associated with a first state variable and the second voltage regulator is associated with one or more second state variables, and the method further comprises determining a derivative of one or more of the one or more second state variables.

7. The method of claim 6, further comprising maintaining the first state variable and the one or more second state variables at their present values for as long as the derivative of one or more of the second state variables is negative, one or more of the second state variables is negative, and the first or second non-linear voltage errors is negative.

8. The method of claim 7, further comprising maintaining the first and second state variables at their present values for as long as the derivative of the second state variable is negative, the second state variable is positive, and the first or second non-linear voltage errors is positive.

9. The method of claim 6, further comprising maintaining the first state variable and the one or more second state variables at their present values for as long as the voltage feedback is outside of a predetermined voltage range.

10. The method of claim 1, further comprising determining one or more voltage regulator parameters for the first and second voltage regulators, wherein the voltage regulator parameters comprise at least one of proportional gains, integral gains, or time constants.

11. The method of claim 10, further comprising varying the voltage regulator parameters based on at least one of a number of online wind turbines in the wind farm or a status of one or more external devices to the wind farm.

12. A method for regulating reactive power in a power system connected to a power grid, the method comprising:

determining, via a non-linear voltage regulator, a non-linear voltage error as a function of a linear voltage error;

calculating a non-linear time constant as a function of at least one of the non-linear voltage error or history of the non-linear voltage regulator;

adjusting the non-linear time constant; and, determining an output of the non-linear voltage regulator based on the non-linear voltage error, a non-linear gain parameter, and the non-linear time constant.

13. A voltage control system, comprising:

a first control path comprising a first voltage regulator, the first control path configured to calculate a linear voltage error as a function of at least one of a voltage feedback or a voltage reference and generate a first output based on the linear voltage error; and, a second control path comprising a second voltage regulator, the second voltage regulator comprising a deadband configured to determine a first non-linear voltage error based on the linear voltage error, the second voltage regulator configured to generate a second output based on the non-linear voltage error, wherein the voltage control system is further configured to generate a reactive power command as a function of the first and second outputs.

14. The voltage control system of claim 13, wherein the second voltage regulator further comprises a transient amplifier configured to generate a second non-linear voltage error so as to amplify voltage changes in a power grid.

15. The voltage control system of claim 13, wherein the second voltage regulator is associated with at least one non-linear time constant, and wherein the second voltage regulator is configured to adjust the at least one non-linear time constant so as to stabilize the second output of the second control path.

16. The voltage control system of claim 13, wherein the first voltage regulator is associated with a first state variable and the second voltage regulator is associated with one or more second state variables, wherein the second voltage regulator is configured to determine a derivative of one or more of the second state variables and maintain the first state variable and the one or more second state variables at their present values for as long as the derivative of the one or more of the second state variables is negative, one or more of the second state variables is negative, and the first or second non-linear voltage errors is negative.

17. The voltage control system of claim 16, wherein the second voltage regulator is configured to maintain the first state variable and the one or more second state variables at their present values if the derivative of one or more of the second state variables is negative, one or more of the second state variables is positive, and the first and second non-linear voltage error is positive.

18. The voltage control system of claim 13, wherein the second voltage regulator is configured to maintain the first state variable and the one or more second state variables at their present values for as long as the voltage feedback is outside of a predetermined voltage range.

19. The voltage control system of claim 13, wherein the voltage control system is configured to determine one or more voltage regulator parameters for the first and second voltage regulators and vary the voltage regulator parameters based on at least one of a number of online wind turbines in the wind farm or a status of one or more external devices to the wind farm, wherein the voltage regulator parameters comprise at least one of proportional gains, integral gains, or time constants.

* * * * *